US011339304B2

(12) United States Patent
Zhang et al.

(10) Patent No.: US 11,339,304 B2
(45) Date of Patent: May 24, 2022

(54) POLYMER EMULSION AS BINDER FOR CONDUCTIVE COMPOSITION

(71) Applicants: HENKEL IP & HOLDING GMBH, Duesseldorf (DE); HENKEL AG & CO. KGAA, Duesseldorf (DE)

(72) Inventors: Wenhua Zhang, Farmington, CT (US); Qinyan Zhu, Cheshire, CT (US); John G. Woods, Farmington, CT (US); Hong (Dorothy) Jiang, Irvine, CA (US); Junjun Wu, Shanghai (CN); Mark Jason, Longmeadow, MA (US)

(73) Assignee: Henkel AG & Co. KGaA, Dusseldorf (DE)

( * ) Notice: Subject to any disclaimer, the term of this patent is extended or adjusted under 35 U.S.C. 154(b) by 121 days.

(21) Appl. No.: 16/012,840

(22) Filed: Jun. 20, 2018

(65) Prior Publication Data
US 2018/0298222 A1 Oct. 18, 2018

Related U.S. Application Data

(63) Continuation of application No. PCT/US2016/067673, filed on Dec. 20, 2016.
(Continued)

(51) Int. Cl.
*C09D 11/52* (2014.01)
*H01B 1/22* (2006.01)
(Continued)

(52) U.S. Cl.
CPC ............... *C09D 11/52* (2013.01); *C08F 2/38* (2013.01); *C08F 120/14* (2013.01); *C08K 3/08* (2013.01);
(Continued)

(58) Field of Classification Search
CPC ............. H01B 1/14; H01B 1/16; H01B 1/20; H01B 1/22; C08K 3/08; C08K 3/16; C08K 3/22;
(Continued)

(56) References Cited

U.S. PATENT DOCUMENTS

| 2,647,107 | A | * | 7/1953 | Barnes | ...................... C08F 2/38 |
| | | | | | 526/206 |
| 4,323,661 | A | | 4/1982 | Kraus et al. | |
| 6,576,336 | B1 | * | 6/2003 | LeGrande | ................ C09D 5/24 |
| | | | | | 106/31.25 |
| 6,747,102 | B1 | | 6/2004 | Christie et al. | |
| 7,037,447 | B1 | | 5/2006 | Yang et al. | |

(Continued)

FOREIGN PATENT DOCUMENTS

| CN | 1646633 A | 7/2005 |
| CN | 103242465 A | 8/2013 |

(Continued)

OTHER PUBLICATIONS

Ghasdian ("ABC terpolymers: micelles, polymersomes and the stabilisation of water in water emulsions", The University of Hull). (Year: 2013).*
(Continued)

*Primary Examiner* — Matthew R Diaz
(74) *Attorney, Agent, or Firm* — Sun Hee Lehmann; Steven C. Bowman

(57) ABSTRACT

Provided herein are metal conductive compositions with improved conductivity. The improved conductivity is attributable to the addition of a sintering agent and a polymer emulsion.

26 Claims, 1 Drawing Sheet

Control 1

Sample No. 1

Related U.S. Application Data

(60) Provisional application No. 62/387,557, filed on Dec. 23, 2015.

(51) Int. Cl.
```
C08K 3/22       (2006.01)
C08F 120/14     (2006.01)
C08K 3/08       (2006.01)
C08F 2/38       (2006.01)
C08K 3/10       (2018.01)
C08K 5/09       (2006.01)
C08K 5/02       (2006.01)
C08K 3/32       (2006.01)
C08K 3/16       (2006.01)
C09D 11/037     (2014.01)
C09D 11/107     (2014.01)
C09D 11/108     (2014.01)
C08K 5/51       (2006.01)
B22F 1/10       (2022.01)
B22F 1/052      (2022.01)
B22F 1/0545     (2022.01)
```

(52) U.S. Cl.
CPC .............. *C08K 3/10* (2013.01); *C08K 3/16* (2013.01); *C08K 3/22* (2013.01); *C08K 3/32* (2013.01); *C08K 5/02* (2013.01); *C08K 5/09* (2013.01); *C09D 11/037* (2013.01); *C09D 11/107* (2013.01); *C09D 11/108* (2013.01); *H01B 1/22* (2013.01); *B22F 1/052* (2022.01); *B22F 1/0545* (2022.01); *B22F 1/10* (2022.01); *B22F 2999/00* (2013.01); *C08F 2410/01* (2013.01); *C08K 5/51* (2013.01); *C08K 2201/003* (2013.01)

(58) Field of Classification Search
CPC .............. C08K 3/24; C08K 2003/0806; C08K 2003/0812; C08K 2003/0831; C08K 2003/162; C08K 2003/166; C08K 2003/2227; C08K 2003/2286; C08K 5/02; C08K 5/09; C08K 2201/001; C08K 2201/003; C08K 2201/005; H05K 1/092; H05K 1/095; H05K 1/097; C09D 5/02; C09D 5/022; C09D 5/024; C09D 5/027; C09D 5/24; C09D 7/43; C09D 7/60; C09D 7/61; C09D 7/63; C09D 7/65; C09D 7/67; C09D 7/68; C09D 7/69; C09D 11/023; C09D 11/03; C09D 11/037; C09D 11/38; C09D 11/52; C09D 201/02; C09D 201/04; C09D 11/107; C09D 11/108
See application file for complete search history.

(56) References Cited

U.S. PATENT DOCUMENTS

```
7,282,260  B2 * 10/2007  LeGrande  ............... C09D 5/24
                                                    428/323
7,569,160  B2    8/2009  Oldenzijl et al.
7,641,728  B2    1/2010  Oriakhi et al.
7,722,786  B2 *  5/2010  Bao  ......................... H01B 1/22
                                                    252/500
8,673,049  B2 *  3/2014  Jablonski  ............. B22F 1/0022
                                                    75/252
8,828,503  B1    9/2014  Yau et al.
8,940,088  B2    1/2015  Hirata et al.
8,974,705  B2    3/2015  Kuder et al.
2008/0257211 A1 10/2008  Oriakhi
2009/0314529 A1*12/2009  Petersen  ............... C09D 11/30
                                                    174/257
2012/0061623 A1* 3/2012  Foreman  ................. H01B 1/22
                                                    252/513
2012/0168684 A1* 7/2012  Magdassi  ............... B82Y 30/00
                                                    252/500
2012/0320137 A1*12/2012  Fujii  .................... B41J 2/16552
                                                    347/100
2015/0217409 A1* 8/2015  Akagawa  ............... B23K 35/00
                                                    174/126.2
2015/0232709 A1   8/2015  Matsui et al.
2015/0366073 A1*12/2015  Magdassi  ............. C09D 11/101
                                                    174/257
```

FOREIGN PATENT DOCUMENTS

```
CN    104685577  A     6/2015
EP      2889880  A1    7/2015
JP    63-268774  A    11/1988
WO   2010101418  A2    9/2010
WO   2012047690  A1    4/2012
WO   2013036519  A1    3/2013
```

OTHER PUBLICATIONS

Ghasdian, Negar. ABC Terpolymers: Micelles, Polymersomes and Stabilisation of Water in Water Emulsions, being a Thesis submitted for the Degree of Doctor of Philosophy in the University of Hull, The University of Hull, Dec. 2013, [online] [retrieved on Mar. 22, 2017] Retrieved from the Internet: <URL: https://hydra.hull.ac.uk/assets/hull:8621a/content.

Brand, M.P. et al. Journal of Colloid and Interface Science, 415 (2014) pp. 77-84.

Technical Data Sheet WB-1078, Applied Ink Solutions (Formerly Conductive Compounds Company), Hudson, NH 03051.

Magdassi, S., et al. Chem. Mater. 2003, 15, 2208-2217.

Magdassi, S. et al. "Triggering the Sintering of Silver Nanoparticles at Room Temperature" ACS Nano, vol. 4, No. 4, Apr. 27, 2010, pp. 1943-1948.

Grouchko, M. et al. "Conductive Inks with a 'Built-In' Mechanism That Enables Sintering at Room Temperature" ACS Nano, American Chemical Society, US, vol. 5, No. 4, Apr. 26, 2011, pp. 3354-3359.

\* cited by examiner

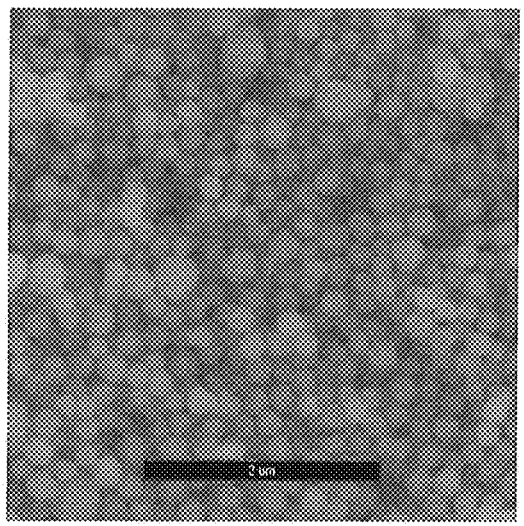
Control 1
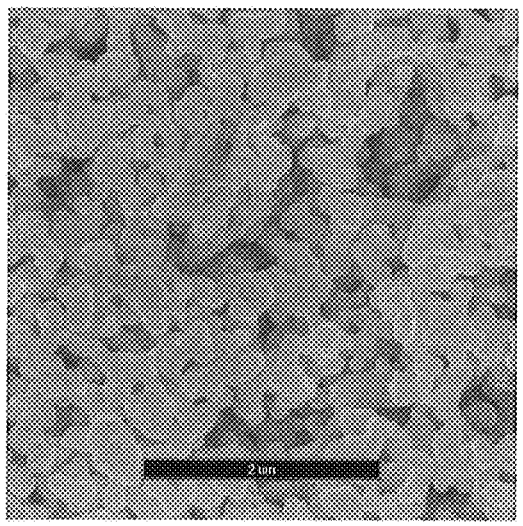
Sample No. 1

POLYMER EMULSION AS BINDER FOR CONDUCTIVE COMPOSITION

BACKGROUND

Field

Provided herein are conductive compositions with improved conductivity. The improved conductivity is attributable to the addition of one or more polymer emulsions as binder and one or more sintering agents in a conductive composition having metal particles.

Brief Description of Related Technology

Conductive compositions are known. An example is a conductive ink which is used in printed electronic applications. One of the main constituents used to impart conductivity to those compositions is silver. The price of silver has fluctuated greatly in recent times, making it difficult for manufacturers to manage their product lines. Thus, research and development investigations involving conductivity have been prevalent lately.

Heretofore, various approaches have been used to create conductive compositions and to improve the conductivity of such compositions. For instance, silver complexes have been introduced into the compositions and then the compositions have been subjected to elevated temperature conditions, such as greater than 150° C., to decompose the silver complex. After decomposition of the silver complex, in-situ silver nanoparticles are formed, which can enhance electrical conductivity. However, many heat sensitive applications require processing temperatures below 150° C.

With the development of flexible electronics, the use of heat sensitive substrates has become more prevalent in the electronics industry, producing a strong demand for materials with high electrical conductivity after being processed at temperatures below 150° C. For example, with the advancement of mobile technology and consumers' desire for bigger screen and narrower bezel there is a pressing need to decrease bezel width and improve bezel line electrical conductivity on touch screen sensors.

Accordingly, it would be desirable to provide an alternative solution to the difficulties imposed by the manner in which electrical conductivity is achieved using known conductive ink compositions.

SUMMARY

The present invention provides such a solution.

Broadly speaking, the invention provides a sinterable conductive composition comprising:
  A metal component having an average particle diameter of greater than about 5 nm to about 100 um;
  A sintering agent; and
  An emulsion comprising water, and at least one polymer having an average particle diameter of about 5 nm to 1000 um.

In a more particular embodiment, the invention provides a sinterable conductive composition comprising:
  A metal component made from or doped with silver, aluminum, gold, germanium or oxides or alloys thereof having an average particle diameter of greater than about 5 nm to about 100 um;
  A sintering agent selected from phosphoric acid, phosphonic acids, formic acid, acetic acid, hydrogen halides, and halide salts of Group I and II metals; and
  An emulsion comprising water and at least one polymer having an average particle diameter of about 5 nm to 1000 um.

In an alternate more particular embodiment, the invention provides a sinterable conductive ink composition comprising: A metal component having an average particle diameter of greater than about 5 nm to about 100 um; and
  An emulsion comprising water, and at least one of polymer grafted with an organohalogen residue having an average particle diameter of greater than about 5 nm to about 100 um.

In another aspect, the invention provides a method of improving the electrical conductivity of an conductive composition, steps of which comprise:
  Providing an emulsion comprising water and at least one of polymer having an average particle diameter of greater than about 5 nm to about 100 um;
  Providing to the emulsion a sintering agent;
  Providing to the emulsion a metal component having an average particle diameter of greater than about 5 nm to about 100 um, to form a conductive composition; and
  Subjecting the conductive composition to a temperature from room temperature to about 200° C. for a time sufficient to sinter the conductive composition.

In yet another aspect, the invention provides a substrate on which is disposed the inventive composition.

In still yet another aspect, the invention provides an emulsion comprising water and at least one polymer grafted with an organohalogen residue.

In any of these embodiments or aspects, the polymer may have a Tg greater than 70° C. and/or a molecular weight of about 200,000 Mw.

This emulsion provides improved conductivity to the composition by assisting the metal particles to form a sintered network.

In addition, the emulsion promotes health, safety and environmental benefits compared with solvent base emulsions that serve a similar role, since the emulsion contains water as a component.

BRIEF DESCRIPTION OF THE DRAWING

FIG. 1 depicts an SEM image of Control 1 and Sample No. 1, each taken after heating at a temperature of 120° C. for a period of time of 30 minutes. The silver nano particles shown in Control 1 are present in a more granular form, whereas those in Sample No. 1 are shown to have agglomerated into a more three dimensional structure, which has reduced the interstices and therefore the voids therebetween.

DETAILED DESCRIPTION

As noted above, the invention provides a sinterable conductive composition comprising:
  A metal component having an average particle diameter of greater than about 5 nm to about 100 um;
  A sintering agent; and
  An emulsion comprising water, and at least one polymer having an average particle diameter of about 5 nm to 1000 um.

Consistent with the invention a suitable sinterable conductive composition should have a VR of $1 \times 10^{-4}$ or lower.

In a more particular embodiment, the invention provides a sinterable conductive composition comprising:
  A metal component made from or doped with silver, aluminum, gold, germanium or oxides or alloys thereof having an average particle diameter of greater than about 5 nm to about 100 um;

A sintering agent selected from phosphoric acid, phosphonic acids, formic acid, acetic acid, hydrogen halides, and halide salts of Group I and II metals; and An emulsion comprising up to about 95% by weight water, and at least one polymer having an average particle diameter of about 5 nm to 1000 um, which serves as a binder.

In an alternate more particular embodiment, the invention provides a sinterable conductive ink composition comprising:

A metal component having an average particle diameter of greater than about 5 nm to about 100 um; and An emulsion comprising water, and at least one of polymer grafted with an organohalogen residue having an average particle diameter of about 5 nm to 1000 um.

In another aspect, the invention provides a method of improving the electrical conductivity of an composition, steps of which comprise:

Providing an emulsion comprising water and at least one polymer having an average particle diameter of about 5 nm to 1000 um;

Providing to the emulsion a sintering agent;

Providing to the emulsion a metal component having an average particle diameter of greater than about 5 nm to about 100 um, to form an ink composition; and Subjecting the composition to a temperature from room temperature to about 200° C. for a time sufficient to sinter the ink composition.

In yet another aspect, the invention provides a substrate on which is disposed the inventive composition.

In still yet another aspect, the invention provides an emulsion comprising water and at least one of polymer grafted with an organohalogen residue.

In the conductive composition, in the various embodiments, the metal component may be chosen from metals made from or doped with silver, aluminum, gold, germanium or oxides or alloys thereof. The average particle diameter of the metal component is from about 20 nm to less than about 1 um, such as from about 200 to about 1000 nm.

When the metal component is silver, the silver may be in any shape that lends itself to the commercial application at hand. For instance, spherical, oblong, powder, and flake shapes of the silver are useful. The silver may be supplied as a dispersion in an appropriate liquid vehicle or as a solid in dry form.

The silver may be sourced from a variety of commercial suppliers, such as Ferro Corporation, Mayfield Heights, Ohio, Inframat Advanced Materials, Manchester, Conn. or Metalor Technologies USA Corporation, North Attleboro, Mass. Mixtures of different size silver flakes, such as a mixture of 11000-25, available from Ferro, and 47MR-23S, commercially available from Inframat, may be used as well.

The silver may be used in the range of about 40 to about 99.5 weight percent of the composition, such as in the range of about 60 to about 98 weight percent of the composition.

The polymer should be selected from those made from monomers polymerized or copolymerized from styrene, butadiene, acrylic and methacrylic esters, chloroprene, vinyl chloride, vinyl acetate, acrylonitrile, acrylamide, ethylene, siloxane, epoxies, vinyl ether and many others. Particularly desirable polymers include polystyrene and polymethylmethacrylate.

The size of the polymer particles in the emulsion was measured with a static light scattering device called HORIBA LA-910, which provides the average particle size and a particle size distribution.

Polymer molecular weights were determined by Gel Permeation Chromatography, Water 1525 Pump, 2414 RI Detector and 2487 UV Detector, 717 Auto Sampler, Empower 3 software. Linear and narrow molecular weight PMMA standards were used for calibration to determine the weight average molecular weight ("Mw"), the number average molecular weight ("Mn") and the polydispersity ("Mw/Mn").

In some embodiments, the polymer is grafted with an organohalogen residue.

In some embodiments, the polymer is terminated with a diiodomethyl residue.

The polymer should be present in the emulsion in an amount of 0.5 to 90 weight percent, desirably at about 10 weight percent.

The ratio of the particle size of metal component to polymer should be about 0.02 to about 50, such as about 1.0 to about 0.1.

The emulsion may include water in an amount of up to about 95% by weight, such as up to about 50% by weight, desirably up to about 10% by weight.

The composition may include a sintering agent, which may be an acid or a salt, or may include a polymer onto which is grafted an organohalogen residue, which in part serves as a sintering agent. However, not any acid will suffice. For instance, sulfuric acid will not show improved sintering or volume resistivity. But phosphoric acid, formic acid, acetic acid, and hydrogen halides, such as hydrofluoric acid, hydrochloric acid, hydrobromic acid and hydroiodic acid, will.

Halide salts of Group I and II metals, such as sodium fluoride, sodium chloride, sodium bromide, sodium iodide, potassium fluoride, potassium chloride, potassium bromide, potassium iodide, and the like, may also be used as the sintering agent.

The sintering agent is present in an amount of about 0.01 weight percent to about 10 weight percent.

The sintering aid, when in solid form such as a halide salt, may be added as a solid, or it may be added as a solution in water (up to about 50% by weight) so that the inventive ink has a concentration of sintering aid up to about 0.1 to 5% by weight.

The conductive composition may include a surfactant. Where the surfactant is present, it may be selected from anionic surfactants, which contain anionic functional groups at their head, such as sulfate, sulfonate, phosphate, and carboxylates. Prominent alkyl sulfates include ammonium lauryl sulfate, sodium lauryl sulfate [or, sodium dodecyl sulfate (SDS)] and the related alkyl-ether sulfates, sodium laureth sulfate [or, sodium lauryl ether sulfate (SLES)], and sodium myreth sulfate. Where the surfactant is present, it may be used in an amount of up to 10% by weight.

The conductive composition may also include an organohalogen compound as a conductivity promoter. The organohalogen compound is a liquid at room temperature. The organohalogen compound should have a boiling point of less than about 150° C., such as for instance less than about 120° C., desirable less than about 100° C., and suitably above about 70° C. The organohalogen compound desirably has one or more iodine atoms attached thereto. Desirably, only one iodine atom is attached to the organoiodide compound.

The organo portion of the organohalogen compound may be alkyl or aryl. When it is alkyl, it should be a lower alkyl where the alkyl portion is up to twelve carbon atoms.

Representative examples of the organohalogen compound include 2-iodopropane, 1-iodopropane, 2-iodo-2-methylpropane, 2-iodobutane, 2-fluorobenzotrifluoride, 3-fluorobenzotrifluoride, 4-fluorobenzotrifluoride, fluorobenzene, 2-fluoro ethanol, 1-fluorododecane, 1-fluorohexane, 1-fluoroheptane and trifluoroacetic acid. Of course, mixtures of any two or more of these organohalogen compounds may also be used.

The organohalogen compound should be used in an amount of less than or equal to about 5 percent by weight. Desirably about 0.25 percent by weight has proven to be effective.

Table A provides a list of organohalogen compounds that are useful as conductivity promoters. Organohalogen compounds with boiling points less than about 150° C. encourage a minimum residue in the cured conductive ink.

TABLE A

| Name of Organohalogen | Boiling Point (° C.) |
| --- | --- |
| 2-iodopropane | 88-90 |
| 1-iodopropane | 101-102 |
| 2-iodo-2-methylpropane | 99-100 |
| 2-iodobutane | 119-120 |
| 2-fluorobenzotrifluoride | 114-115 |
| 3-fluorobenzotrifluoride | 101-102 |
| 4-fluorobenzotrifluoride | 102-105 |
| fluorobenzene | 85 |
| 2-fluoro ethanol | 103 |
| 1-fluorododecane | 106 |
| 1-fluorohexane | 92-93 |
| 1-fluoroheptane | 119 |
| trifluoroacetic acid | 72.4 |

The organohalogen compound is useful to improve the electrical conductivity of the composition and to maintain the electrical conductivity while reducing the loading of the metal component.

In order to render the inventive conductive compositions more readily dispensable it is oftentimes desirable to dilute the composition in an appropriate solvent. The dilution should be about 1 part of the composition to about 5 parts of solvent. Many solvents are suitable for use in the inventive compositions, provided the chosen solvent is compatible with the organohalogen compound.

The inventive conductive compositions are suitable for applications where high electrical conductivity is required on plastic or other substrates, such as PET and PC.

EXAMPLES

Example 1

A composition was prepared by mixing nano-particle silver (7K-35, with a surfactant alcohol solvent, known as DOWANOL, from Ferro Corporation, OH) into a polymethyl methacrylate emulsion (10% PMMA in water, with a PMMA average particle size of 61 nm, from Magsphere Corporation, CA). A sintering aid, $H_3PO_4$ (10% by weight in water), was added to Sample No. 1 and then mixed at 3000 rpm for 60 seconds. As a control, Control 1, was used to compare performance relative to Sample No. 1. Scanning Electron Microscope ("SEM") images were acquired using Hitachi field emission SEM model S-4500, and are presented in FIG. 1.

TABLE 1

| Constituents | Control 1 | Sample No. 1 |
| --- | --- | --- |
| NP Ag N7k-35 (Ag 86.5%) | 100 | 62.5 |
| PMMA Emulsion (10% solid) 61 nm | 0 | 35.8 |
| $H_3PO_4$ | 0 | 1.7 |

The compositions in Table 1 were each applied to glass slides, and prepared as set forth herein, so that volume resistivity measurements could be made.

The volume resistivity ("VR") of the prepared composition was measured by a standard strip method. Each specimen for the strip electrical conductive test was prepared by first coating a thin layer onto a glass slide masked with tape. The ink layer was dried at ambient temperature and subsequently cured at a designed temperature over a set period of time. The resistivity was measured with a four-probe ohm meter, and the volume resistivity was calculated from the equation: $VR=(M)(T)(W_i)/D$, where M is the measured resistivity in mOhms, T is the thickness of the strip in centimeters (cm), $W_i$ is the width of the strip in cm, and D is the distance between the probes (cm).

Table 1A shows volume resistivity (in ohm·cm) measurements for Control 1 and the inventive composition, Sample No. 1, which are each set forth above in Table 1. The compositions were prepared at a temperature of 120° C. for a period of time of 30 minutes.

TABLE 1A

| Control 1 | Sample No. 1 |
| --- | --- |
| >2 Million | 4.0E−05 |

Table 1A show that the PMMA emulsion and sintering aid (aqueous $H_3PO_4$) decreases the volume resistivity (Sample No. 1) while the control (nano silver paste only) had higher volume resistivity after each was heated at a temperature of 120° C. for a period of 30 minutes. The addition of PMMA emulsion and $H_3PO_4$ improved the electrical conductivity of the silver ink over 10 orders of magnitude.

Considering both the resistivity measurement and the SEM results, one can infer that the addition of a polymer emulsion and sintering aid in the inventive compositions helps nano silver to sinter and form an interconnected network, therefore becoming much more conductive than the control composition.

Example 2

Four compositions were prepared by mixing nano-particle silver (7K-35, from Ferro Corporation, Mayfield Heights, Ohio) into a polystyrene emulsion (10% PSt in water, with a PSt average particle size that varied from 62 nm, 200 nm and 600 nm, from Magsphere Corporation, Pasadena, Calif.). A sintering aid, $H_3PO_4$ (10% by weight in water), was added to Sample Nos. 3, 4 and 5 and then mixed at 3000 rpm for a period of time of 60 seconds. The so-formed compositions were used for preparing test specimens.

TABLE 2

| Constituents | Sample No./Amt (wt %) | | | |
|---|---|---|---|---|
| | Control 2 | 2 | 3 | 4 |
| NP Ag N7k-35 (Ag 86.5%) | 64.5 | 71.4 | 71.4 | 71.4 |
| PSt Emulsion (10% solid) | 35.5 (62 nm) | 27.3 (62 nm) | 27.3 (200 nm) | 27.3 (600 nm) |
| $H_3PO_4$ | 0 | 1.3 | 1.3 | 1.3 |

Table 2A shows volume resistivity (in ohm·cm) measurements for Control 2 and three inventive compositions, Sample Nos. 2, 3 and 4, which are each set forth above in Table 2. The compositions were heated at a temperature of 120° C. for a period of time of 30 minutes.

TABLE 2A

| Sample No. | | | |
|---|---|---|---|
| Control 2 | 2 | 3 | 4 |
| >2 Million | 4.6E−05 | 5.5E−05 | 2.8E−04 |

Table 2A shows that the sintering aid (aqueous $H_3PO_4$) decreases the volume resistivity of silver ink formulated with PSt emulsions (Sample Nos. 2, 3 and 4) while the control (without the sintering aid, $H_3PO_4$) had higher volume resistivity after curing at a temperature of 120° C. for a period of time of 30 minutes. The addition of sintering aid $H_3PO_4$ improved the electrical conductivity of the silver ink compositions with each of the PSt emulsions with different particle sizes (i.e., 62 nm, 200 nm, 600 nm). Thus, the inventive compositions have better electrical conductivity performance than the control composition. Within this defined sampling, a smaller particle size of PSt in the emulsion seems to be desirable to achieve excellent volume resistivity performance.

Example 3

Here, two compositions were prepared by mixing nanoparticle silver (7K-35, from Ferro Corporation) into a polymethyl methacrylate emulsion (10% PMMA in water, with a PMMA average particle size of 61 nm). Two different sintering aids were chosen—$H_3PO_4$ and KI (each 10% by weight in water). The sintering aids were added to Sample Nos. 5 and 6 and then mixed at 3000 rpm for 60 seconds. The so-formed compositions were used for preparing test specimens.

TABLE 3

| Constituents | Sample No./Amt (wt %) | |
|---|---|---|
| | 5 | 6 |
| NP Ag N7k-35 (Ag 86.5%) | 66.3 | 67.0 |
| PMMA Emulsion | 33.3 | 32.8 |
| $H_3PO_4$ | 0.4 | 0 |
| KI | 0 | 0.13 |

Table 3A shows volume resistivity (in ohm·cm) measurements for two inventive compositions, Sample Nos. 5 and 6, which are each set forth above in Table 3. The compositions were cured at a lower temperature than earlier—a temperature of 80° C. instead of 120° C.—for a period of time of 30 minutes.

TABLE 3A

| Sample No. | |
|---|---|
| 5 | 6 |
| 1.2E−05 | 3.1E−05 |

Table 3A shows that each of the polymer emulsion and sintering aid combinations decreases the volume resistivity of silver nano particle coatings (Sample Nos. 5 and 6), compared to Control 1 (Table 1A).

Example 4

The synthesis of iodine-grafted polymethyl methacrylate is described as is shown in the scheme below, where n is 5 to 10,000.

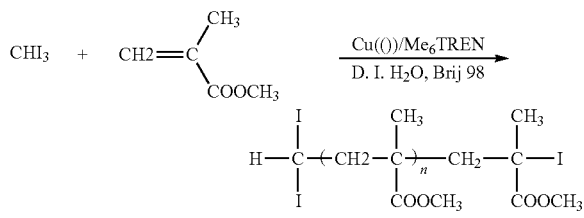

130 g of D.I. water, of 2.0 g of Brij 98 surfactant [polyoxyethylene oleyl ether, $C_{18}H_{35}(OCH_2CH_2)_{20}H$], and 0.064 g (1 mmol) g of copper powder (<10 micron) were added to a 500-ml four-neck round-bottom flask equipped with a mechanical stirrer. 0.178 g (1 mmol) of $Me_6TREN$, 0.394 g (1 mmol) of iodoform and 20 g (200 mmol) of methyl methacrylate was added to a 50 milliliter Schlenk tube. Both mixtures were degassed by 6 freeze-pump-thaw cycles under a nitrogen environment. The methyl methacrylate/$Me_6TREN$/$CHI_3$ mixture was transferred to the round-bottom flask via a cannula under nitrogen. The polymerization reaction was continued at room temperature for a period of time of 5 hours and stopped with the introduction of air.

Iodine-grafted PMMA had formed and was dried at a temperature of 100° C., resulting in a yield of 47%. By GPC analysis, the weight average molecular weight, $M_w$, was determined to be about 278,600 and the molecular weight distribution or polydispersity, $M_w/M_n$, was about 3.3.

The emulsion particle size was measured with a HORIBA LA-910 instrument, and the median size determined to be about 85 nm.

Example 5

The iodine-grafted PMMA from Example 4 was used to prepare a composition with nano-particle silver (7K-35) to form an emulsion. The emulsion contained the iodine-grafted PMMA, in an amount of slightly over 55% by weight of the composition. No additional sintering aid was added; rather, the iodine-grafted PMMA acted both as a binder and as a sintering aid. The composition was mixed at 3000 rpm for a period of time of 60 seconds, and then used to prepare test specimens.

TABLE 4

| | Sample No./Amt (wt %) | |
|---|---|---|
| Constituents | 5 | 7 |
| NP Ag N7k-35 (Ag 86.5%) | 66.3 | 56 |
| PMMA Emulsion (10% solid) 61 nm | 33.3 | 0 |
| $H_3PO_4$ | 0.4 | 0 |
| $CHI_2$-PMMA-I Emulsion (5.8% solid) 85 nm | 0 | 44 |

Table 4A shows volume resistivity measurements (in ohm·cm) for the inventive compositions, Sample Nos. 5 and 7. The compositions were prepared at the different temperatures—room temperature for a period of time of 20 hours and 80° C. for a period of time of 30 minutes.

TABLE 4A

| 5 | 7 |
|---|---|
| 1.4E−04 | 1.4E−04 |
| 1.2E−05 | 3.2E−05 |

Table 4A shows that the compositions demonstrated a decreased volume resistivity compared to Control 1 (Table 1A), irrespective of the temperature and time used to cure the composition.

Example 6

Two compositions were prepared by mixing nano-particle silver (7K-35, from Ferro Corporation) into a polystyrene emulsion (49% PSt in water, from Arkema Inc., Cary, N.C.). A sintering aid, KI (3.5% by weight in water), was added to Sample No. 8 while to the control 3 was added D.I water instead, and they were mixed at 3000 rpm for 60 seconds. The so-formed compositions were used for preparing test specimens.

TABLE 5

| | Sample No./Amt (wt %) | |
|---|---|---|
| Constituents | Control 3 | 8 |
| NP Ag N7k-35 (Ag 86.5%) | 83.8 | 84.1 |
| ENCOR 8146 (49% solid) | 7.9 | 7.8 |
| KI | 0 | 0.3 |
| D.I. H2O | 8.3 | 7.8 |

Table 5A shows volume resistivity (in ohm·cm) measurements for two compositions, Control 3 and Sample No. 8, which are each set forth above in Table 5. The compositions were heated at a temperature of 100° C. for a period of time of 30 minutes.

TABLE 5A

| Sample No. | |
|---|---|
| Control 3 | 8 |
| >1 Million | 7.8E−05 |

Table 5A shows that the addition of the sintering aid, KI, decreases the volume resistivity of Sample No. 8, compared to Control 3.

Example 7

Two compositions were prepared by mixing nano-particle silver (7K-35, from Ferro Corporation) into a polystyrene emulsion (49% PSt in water, from Arkema Inc.). Sintering aids, 2-iodoethanol (5.0% by weight in water) and iodoacetamide (7.0% by weight in water), were added to Sample Nos. 9 and 10, respectively, and they were mixed at 3000 rpm for 60 seconds. The so-formed compositions were used for preparing test specimens.

TABLE 6

| | Sample Nos./Amt(wt %) | |
|---|---|---|
| Constituents | 9 | 10 |
| NP Ag N7k-35 (Ag 86.5%) | 81.3 | 81.2 |
| ENCOR 8146 (49% solid) | 7.2 | 7.2 |
| 2-Iodoethanol | 0.2 | 0 |
| Iodoacetamide | 0 | 0.3 |
| D.I. H2O | 11.3 | 11.3 |

Table 6A shows volume resistivity (in ohm·cm) measurements for two compositions, Sample Nos. 9 and 10, which are each set forth above in Table 6. The compositions were heated at a temperature of 80° C. for a period of time of 30 minutes.

TABLE 6A

| Sample No. | |
|---|---|
| 9 | 10 |
| 5.1E−05 | 5.8E−05 |

Table 6A shows that the addition of organo iodide compounds as conductivity promoters decreases the volume resistivity of Sample Nos. 9 and 10, compared to Control 3.

What is claimed is:

1. A sinterable conductive composition comprising:
   a metal component having an average particle diameter of greater than about 150 nm to about 100 μm, said metal component being made from or doped with silver, aluminum, gold, germanium or oxides or alloys thereof;
   a sintering agent; and
   an emulsion comprising water, and at least one particulate polymer having an average particle diameter wherein a ratio of average metal component particle diameter to average particulate polymer particle diameter is between 1:1 and 10:1.

2. The composition of claim 1, wherein the average particle diameter of the metal component is from about 200 nm to less than about 1 μm.

3. The composition of claim 2, wherein the average particle diameter of the particulate polymer is from about 20 nm to about 1000 nm.

4. The composition of claim 1, wherein the particulate polymer is present in the emulsion in an amount of 0.5 to 80 weight percent.

5. The composition of claim 1, wherein the particulate polymer is a member selected from the group consisting of monomers polymerized or copolymerized from at least one of styrene, butadiene, acrylic and methacrylic esters, chloroprene, vinyl chloride, vinyl acetate, acrylonitrile, acrylamide, ethylene, siloxane, epoxies, and vinyl ether.

6. The composition of claim 1, wherein the particulate polymer is grafted with an organohalogen residue.

7. The composition of claim 1, wherein the particulate polymer is terminated with a diiodomethyl residue.

8. The composition of claim 1, wherein the particulate polymer is present in the emulsion in an amount of up to about 10% by weight.

9. The composition of claim 1, further comprising a surfactant.

10. The composition of claim 9, wherein the surfactant is present in an amount of up to 10% by weight.

11. The composition of claim 1, wherein the sintering agent is an acid.

12. The composition of claim 1, wherein the sintering agent is present in an amount of about 0.01% by weight to about 10% by weight.

13. The composition of claim 1, wherein the sintering agent is selected from phosphoric acid, phosphonic acids, formic acid, acetic acid, hydrogen halides, and halide salts of Group I and II metals.

14. The composition of claim 1, wherein the sintering agent is selected from hydrofluoric acid, hydrochloric acid, hydrobromic acid and hydroiodic acid.

15. The composition of claim 1, further comprising an organohalogen compound.

16. The composition of claim 15, wherein the organohalogen compound is a liquid at room temperature.

17. The composition of claim 15, wherein the halogen of the organohalogen compound is iodine.

18. The composition of claim 15, wherein the organohalogen compound is an alkane halide.

19. The composition of claim 15, wherein the organohalogen compound is represented by halogenated compounds having up to twelve carbon atoms.

20. The composition of claim 15, wherein the organohalogen compound has a boiling point of less than about 150° C.

21. The composition of claim 1, wherein
the sintering agent is selected from phosphoric acid, phosphonic acids, formic acid, acetic acid, hydrogen halides, and halide salts of Group I and II metals; and
the particulate polymer is grafted with an organohalogen residue.

22. A substrate comprising a composition of claim 1 disposed thereon.

23. A sinterable conductive composition comprising:
a metal component made from or doped with silver, aluminum, gold, germanium or oxides or alloys thereof having an average particle diameter of greater than about 150 nm to about 100 μm;
a sintering agent selected from phosphoric acid, formic acid, acetic acid, hydrogen halides, and halide salts of Group I and II metals; and
an emulsion comprising water, and at least one particulate polymer having an average particle diameter, wherein the particulate polymer is selected from polymethylmethacrylate and polystyrene, and wherein a ratio of average metal component particle diameter to average particulate polymer particle diameter is between 1:1 and 10:1.

24. The composition of claim 23 wherein the metal component is silver, and the sintering agent is selected from phosphoric acid and potassium iodide.

25. A sinterable conductive composition comprising:
a metal component having an average particle diameter of greater than about 150 nm to about 100 μm; and
an emulsion comprising water, and at least one particulate polymer grafted with an organohalogen residue having an average particle diameter, and wherein a ratio of average metal component particle diameter to average particulate polymer particle diameter is between 1:1 and 10:1.

26. The composition of claim 25, wherein the particulate polymer is terminated with a diiodomethyl residue.

* * * * *

UNITED STATES PATENT AND TRADEMARK OFFICE
CERTIFICATE OF CORRECTION

PATENT NO. : 11,339,304 B2
APPLICATION NO. : 16/012840
DATED : May 24, 2022
INVENTOR(S) : Wenhua Zhang et al.

It is certified that error appears in the above-identified patent and that said Letters Patent is hereby corrected as shown below:

In the Specification

Column 3, Line 51 change "Manchester, Conn." to --Manchester, CT--.

Column 8, Line 24 change "Cu(())/Me$_6$ TREN" to --Cu(0) / Me$_6$ TREN--.

Column 8, Line 32 change "(OCH$_2$CH$_2$)$_{20}$H" to --(OCH$_2$CH$_2$)$_{20}$OH--.

Signed and Sealed this
Seventh Day of February, 2023

Katherine Kelly Vidal
*Director of the United States Patent and Trademark Office*